United States Patent
Labarca Finol et al.

(10) Patent No.: US 9,617,481 B2
(45) Date of Patent: Apr. 11, 2017

(54) COMPOSITION OF BIODEGRADABLE SURFACTANTS FOR SEPARATING IMPURITIES IN A HYDROCARBON

(71) Applicant: ENVIRONMENTAL DEVELOPMENT PRODUCTS (ENDEVPRO), LIMITED, St. Michael (BB)

(72) Inventors: Osmerio Enrique Labarca Finol, Estado Zulia (VE); Rixio Egardo Reyes Lopez, Cabimas (VE)

(73) Assignee: ENVIRONMENTAL DEVELOPMENT PRODUCTS (ENDEVPRO), LTD. (BB)

( * ) Notice: Subject to any disclaimer, the term of this patent is extended or adjusted under 35 U.S.C. 154(b) by 399 days.

(21) Appl. No.: 14/533,565

(22) Filed: Nov. 5, 2014

(65) Prior Publication Data

US 2015/0065400 A1 Mar. 5, 2015

Related U.S. Application Data

(62) Division of application No. 13/475,438, filed on May 18, 2012.

(30) Foreign Application Priority Data

Jan. 2, 2012 (MX) ..................... MX/a2010/000253

(51) Int. Cl.
*C09K 8/52* (2006.01)
*C10G 33/04* (2006.01)
(Continued)

(52) U.S. Cl.
CPC ............... *C10G 33/04* (2013.01); *C09K 3/32* (2013.01); *C09K 8/035* (2013.01); *C09K 8/52* (2013.01); *C09K 8/602* (2013.01); *C10G 1/045* (2013.01); *C10G 29/06* (2013.01); *C10G 29/12* (2013.01); *C10G 29/20* (2013.01); *C10G 29/22* (2013.01); *C10G 29/28* (2013.01); *C11D 7/06* (2013.01); *C11D 7/08* (2013.01); *C11D 7/10* (2013.01);
(Continued)

(58) Field of Classification Search
None
See application file for complete search history.

(56) References Cited

U.S. PATENT DOCUMENTS

| 4,511,488 A | 4/1985 | Matta |
| 5,336,428 A | 8/1994 | Kaplan et al. |

(Continued)

*Primary Examiner* — Alicia Bland
(74) *Attorney, Agent, or Firm* — Merchant & Gould P.C.

(57) ABSTRACT

Compositions of biodegradable surfactants useful for optimizing the separation of impurities typical of hydrocarbons, and designed to intervene and stabilize the molecular structure of crude oil, with no significant alterations of the crude's intrinsic composition are disclosed. The biodegradable surfactants compositions coexist with a non-ionic surfactant and an organic mix in emulsion form with the purpose of isolating crude from the pipeline, reduce friction to improve crude flow and to enter the crude macromolecule to modify the hydrocarbon chain to reduce its density and thus its viscosity; including compositions of biodegradable surfactants that comprise sodium hydroxide 1N, potassium chloride, sulphonic acid, dodecanoic acid, nonylphenol, terpene-1 and water, preferably hard water.

1 Claim, 5 Drawing Sheets

Figure 1:
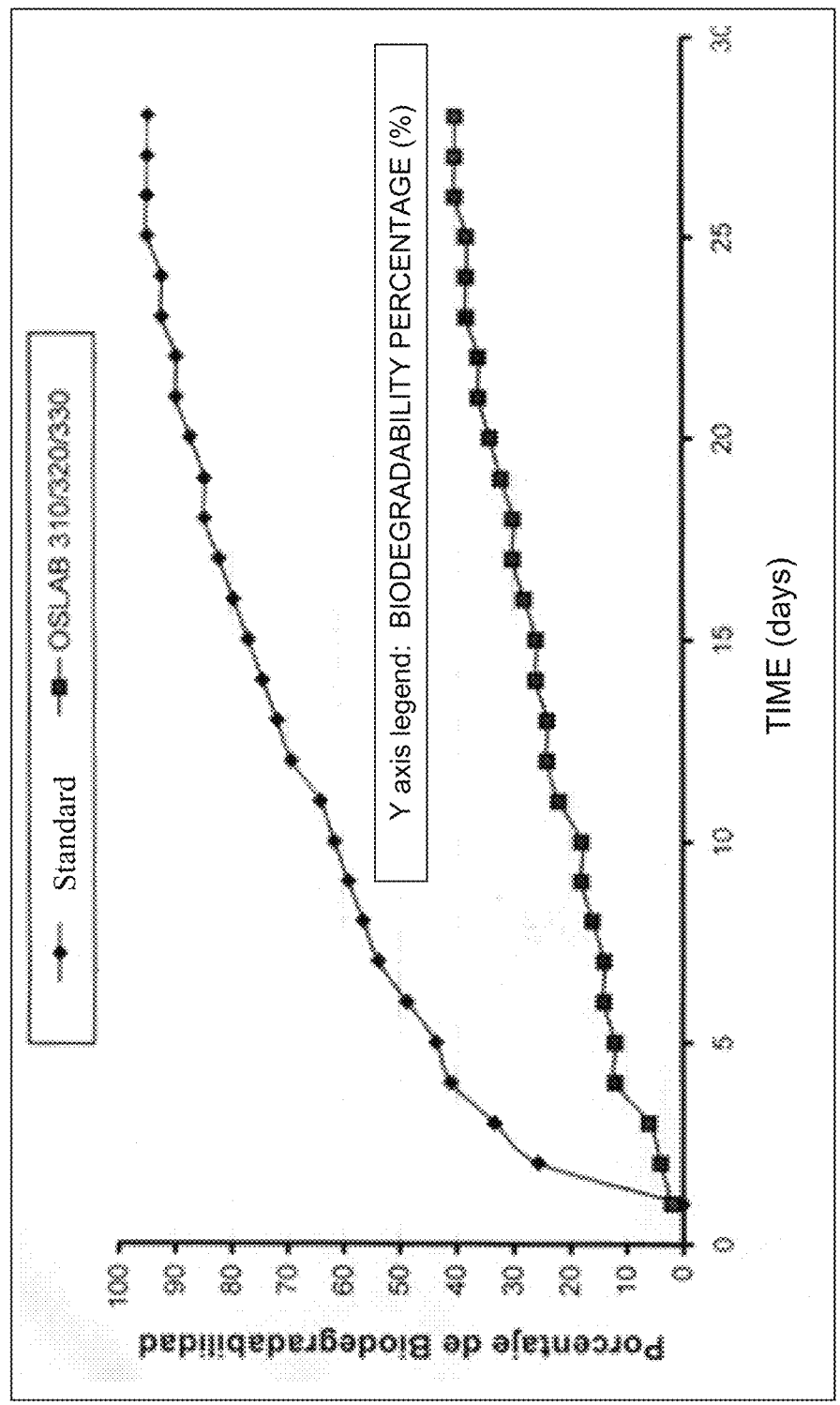

(51) Int. Cl.
*C09K 3/32* (2006.01)
*C09K 8/60* (2006.01)
*E21B 21/06* (2006.01)
*C09K 8/035* (2006.01)
*C10G 1/04* (2006.01)
*C10G 29/06* (2006.01)
*C10G 29/12* (2006.01)
*C10G 29/20* (2006.01)
*C10G 29/22* (2006.01)
*C10G 29/28* (2006.01)
*C11D 7/06* (2006.01)
*C11D 7/08* (2006.01)
*C11D 7/10* (2006.01)
*C11D 7/24* (2006.01)
*C11D 7/26* (2006.01)

(52) U.S. Cl.
CPC .............. *C11D 7/248* (2013.01); *C11D 7/261* (2013.01); *C11D 7/265* (2013.01); *E21B 21/068* (2013.01)

(56) References Cited

U.S. PATENT DOCUMENTS

| 5,549,839 | A |   | 8/1996 | Chandler |             |
|-----------|---|---|--------|----------|-------------|
| 5,679,628 | A | * | 10/1997 | Simpson | C11D 3/18   |
|           |   |   |        |          | 134/40      |
| 5,811,383 | A | * | 9/1998 | Klier    | C11D 3/43   |
|           |   |   |        |          | 510/245     |
| 2005/0161372 | A1 | * | 7/2005 | Colic | B01D 17/047 |
|           |   |   |        |          | 208/391     |
| 2011/0272160 | A1 | * | 11/2011 | Arvie, Jr. | C09K 8/524 |
|           |   |   |        |          | 166/311     |

* cited by examiner

COMPOSITION OF BIODEGRADABLE SURFACTANTS FOR SEPARATING IMPURITIES IN A HYDROCARBON

This application is a divisional of U.S. patent application Ser. No. 13/475,438, filed 18 May 2012, which claims the benefit of priority to Mexican Patent Application No. MX/a/2012/000253, filed 2 Jan. 2012, the disclosures of all of which are incorporated herein by reference. To the extent appropriate, a claim of priority is made to the above disclosed applications.

FIELD OF THE INVENTION

The compound of biodegradable surfactants of the present invention has been produced for optimizing the separation of impurities usually found in hydrocarbons, and it is designed to intervene and stabilize the molecular structure of crude oil, without significantly altering its intrinsic composition.

Specifically, when the compound of the invention is injected into the reservoir it eliminates the inorganic components present in the aqueous phase while at the same time it regulates the generation of undesired compounds such as organic precipitates which are susceptible to changes in temperature, pressure and loss of volatile components.

The use at surface level of this compound, in addition to eliminating inorganic salts, dispersing asphaltenes and reducing wax content, adds aromatic compounds to the hydrocarbon chain. Further to the above, it reduces crude friction isolating it from the material through which it flows by displacing the crude adhered to the surface of said material. This principle allows the compound of this invention to be used industrially as a cleaner of any surface impregnated with crude, or even those contaminated with any other oily substance.

STATE-OF-THE-ART

Environmental impact caused by the use of contaminating chemical products is manifold. Damages are to be found in any area where man conducts production activities causing loss of materials, individual properties and furthermore, irreversible damages to the environment in water, land and air. The use of chemical products is, to a great extent, the origin of the imbalance of Nature's cycles which can indirectly affect human health, even to the point of causing death.

The use of these products in the oil industry is very frequent, both at surface level as well as down in the reservoir, and it usually implies the generation of hazardous waste. With this situation in mind the search for developing chemical products that reduce damages and minimize any kind of detrimental effect that may harm man or his environment is an ongoing activity.

Within this context several initiatives have been attempted to yield a safe product that causes no damage to the environment nor to man and that may be injected into oil wells for cleansing purposes while enhancing physical-chemical properties, and thus stimulating oil production.

In the process of searching for such a product several patent documents have been produced, among them U.S. Pat. No. 5,549,839 which discloses the formulation of a non-toxic, biodegradable and completely safe to human and animal contact industrial solvent. Said compound comprises d-limonene (73-74% v/v), an etoxilated nonylphenol (16-17% v/v) and fatty acids, namely tall-oil (9-10% v/v). The fatty acid reported in this document is made up of oleic and linoleic acids, among other substances. According to this document the forementioned product is mixed and applied directly and undiluted to an oil spill or other oil product residues such as greases and heavy crudes.

In spite of the advances presented in U.S. Pat. No. 5,549,839 for cleaning oil spills or other oil residues, the reported composition has no surfactant activity nor does it prevent the precipitation of clays or asphaltenes common in crude oil. Furthermore, the product disclosed in said patent must be applied undiluted to obtain the desired results, this implying that it must be used in large amounts to achieve the cleansing of hydrocarbons.

Another document that addresses the production of a cleansing compound comprising biodegradable components is U.S. Pat. No. 4,511,488. This patent claims a cleansing compound based on a terpene like d-limonene for cleaning heavy crudes, greases and asphalt deposits on hard or flexible layers. Said composition comprises 78 to 96% w/w of a mixture of limonene/surfactant/water in which the individual quantities in the mix are 10-60% w/w of limonene, 10-30% w/w of surfactant and 20-70% w/w of water.

According to said claim the compound would use 2-10 parts of a coupling agent and 2-12 parts of additives to adapt the compound for particular uses. Preferably the compound includes glycols, such as ether glycols like diethylene glycol, hexene glycol or dipropylene glycol. Preferred additives are softening agents, sequestering agents or corrosion inhibitors. Considered surfactants are anionic surfactants (especially amine salts of the dodecylbenzene sulphonic acid), or non-ionic surfactants like the alkylphenol condensates with 4-5 mols of ethylen oxide, particularly the nonylphenol condensate.

Just as in U.S. Pat. No. 5,549,839 the compound claimed in U.S. Pat. No. 4,511,488 has no surfactant activity, does not prevent clay or asphaltene precipitation and must be used undiluted. This implies higher costs which become higher when considering that the use of other additives is necessary, such as glycol ethers, softening and sequestering agents and corrosion inhibitors.

U.S. Pat. No. 5,336,428 must be included to complement the state-of-the-art information available. This patent refers to a compound for degreasing deep-sea off-shore oil drilling platforms made of a mix that comprises 5-7% w/w of limonene, 15-21% w/w of a non-ionic surfactant and 0.2-0.4% w/w of an acrylic copolymer as a densifying agent. According to said document preferred surfactants are polyethoxylated nonylphenol and the polymer of methacrylic acid and acrylate. In this case the compound is viscous and substantially clear. In similar fashion to the two previous patents mentioned before this compound cannot be used in undiluted form because effectiveness is lost. So being the case, the cost of using this product is high.

Considering all the above it becomes evident that in the state-of-the-art there is a need for a water-based product, biodegradable, highly efficient, fit to be used on crude oil and its derivatives for enhancing its physical-chemical properties, that optimizes flow within production pipelines both downhole and on the surface, that reduces and disperses organic precipitates, such as waxes and asphaltenes, breaks water-oil emulsions, minimizes organic salts and hydrogen sulphur contents, cleans oily sands and all kinds of surfaces, and that may even be used to reduce organic waste in the environment or for cleaning animals and birds that have become impregnated with oil because of oil spills.

DETAILED DESCRIPTION OF DRAWINGS

FIG. 1. Percentage of biodegradability of the compound of the present invention.

Figure 2:
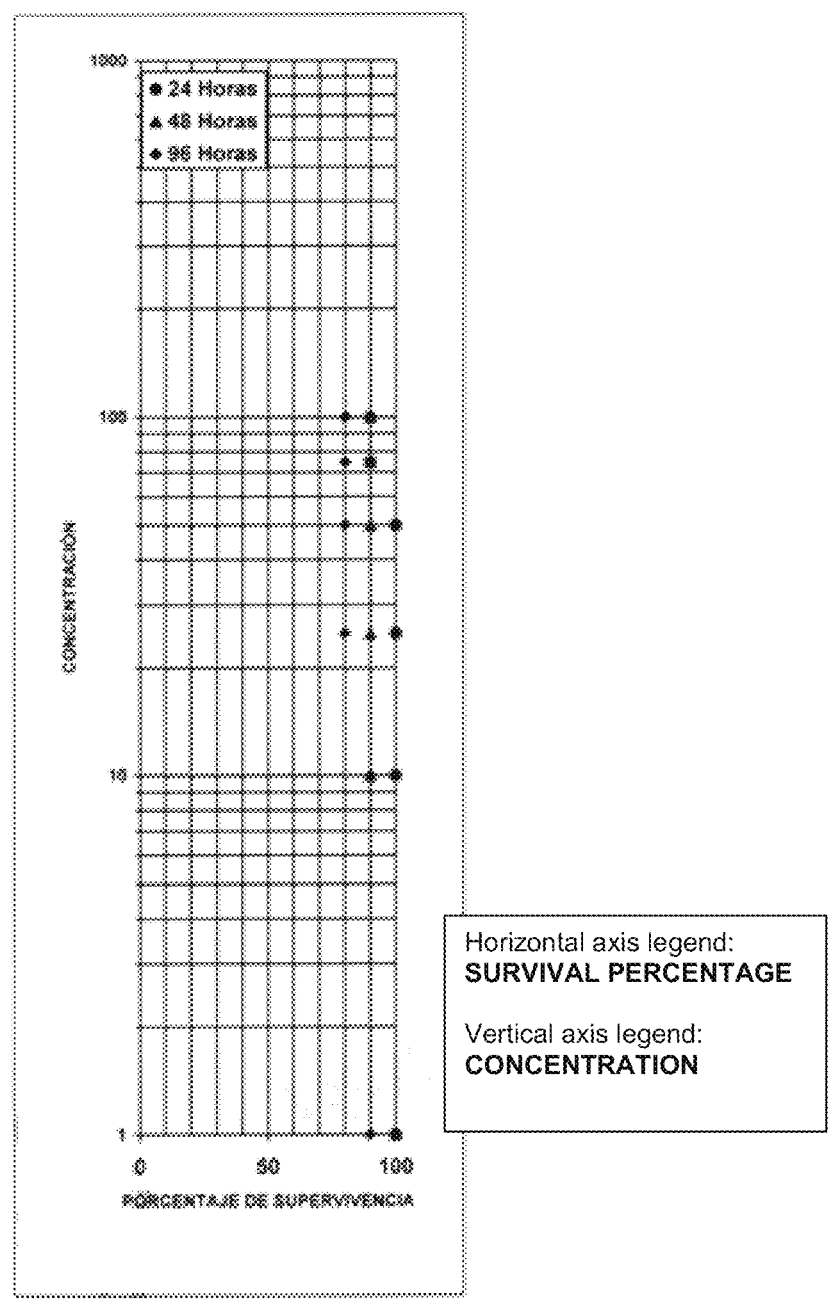

FIG. 2. Results of the toxicity test of the compound of the present invention taken at different hours.

Figure 3:
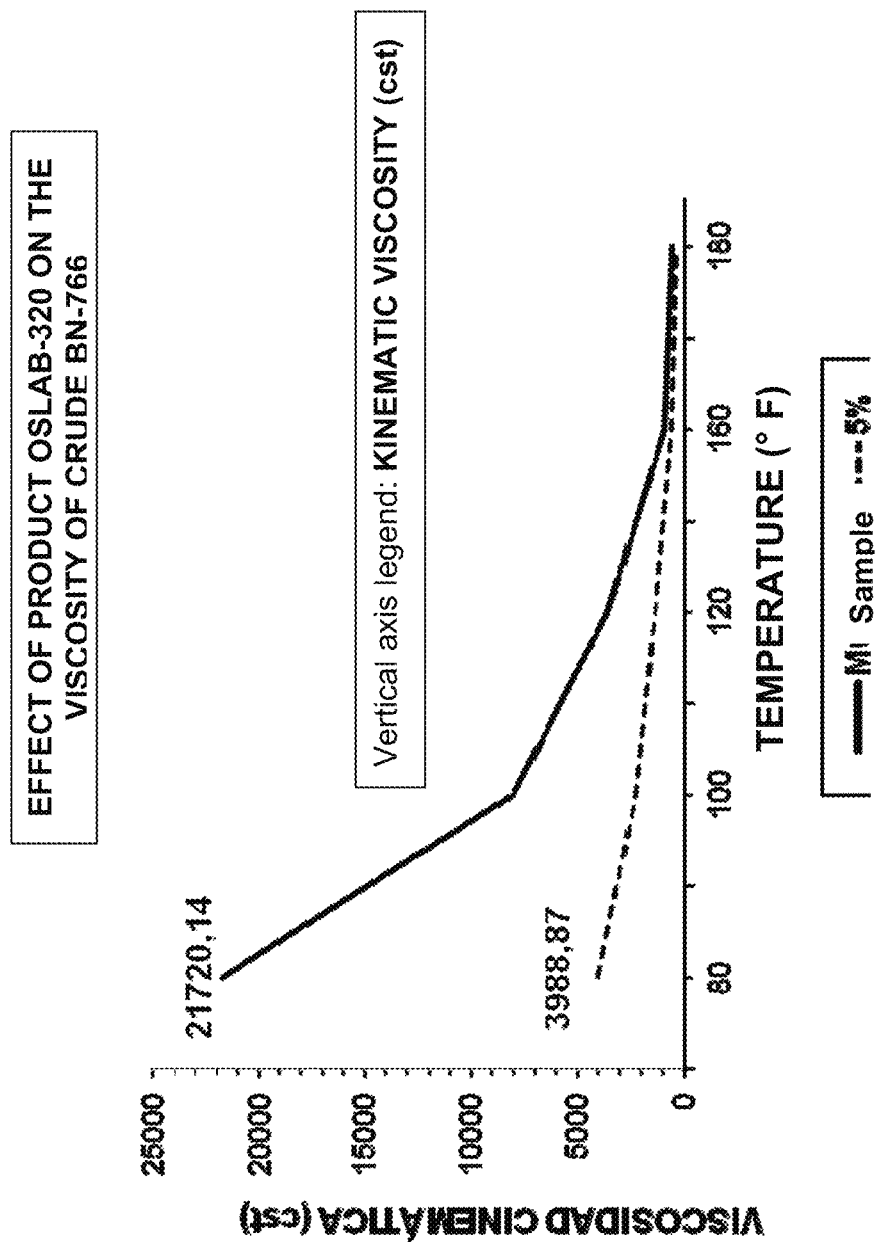

FIG. 3. Effects of the compound of the present invention on crude viscosity.

Figure 4:
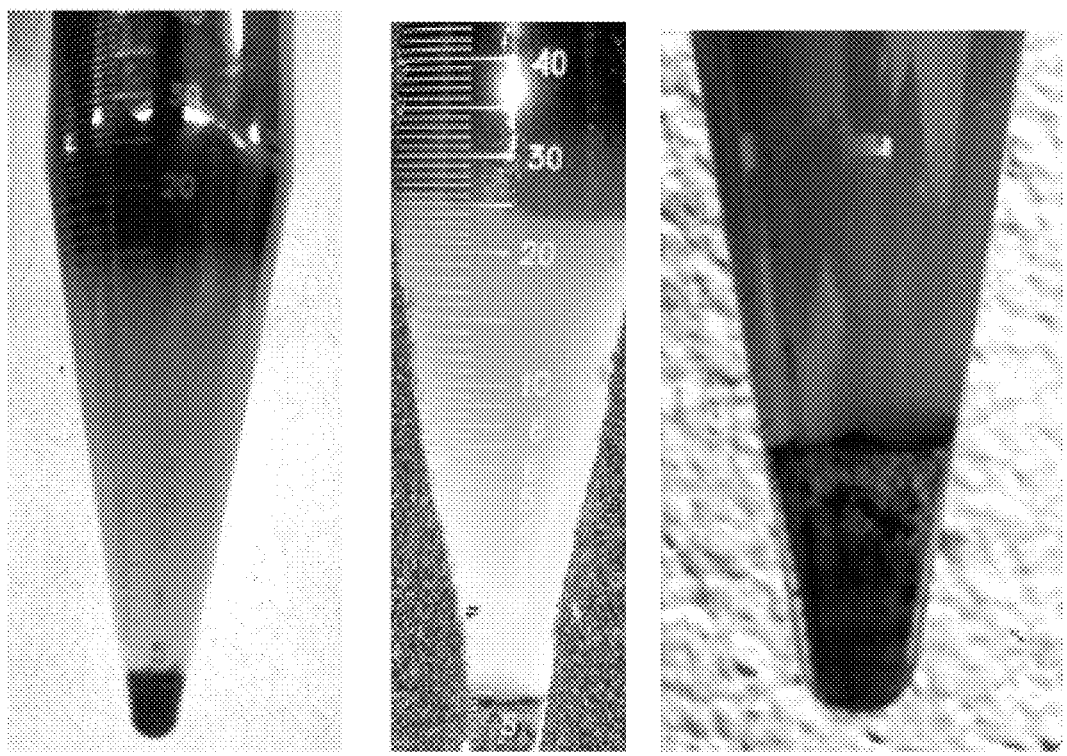

FIG. 4. Effects of the compound of the present invention on emulsion breaking and oxidized organic precipitates.

Figure 5:
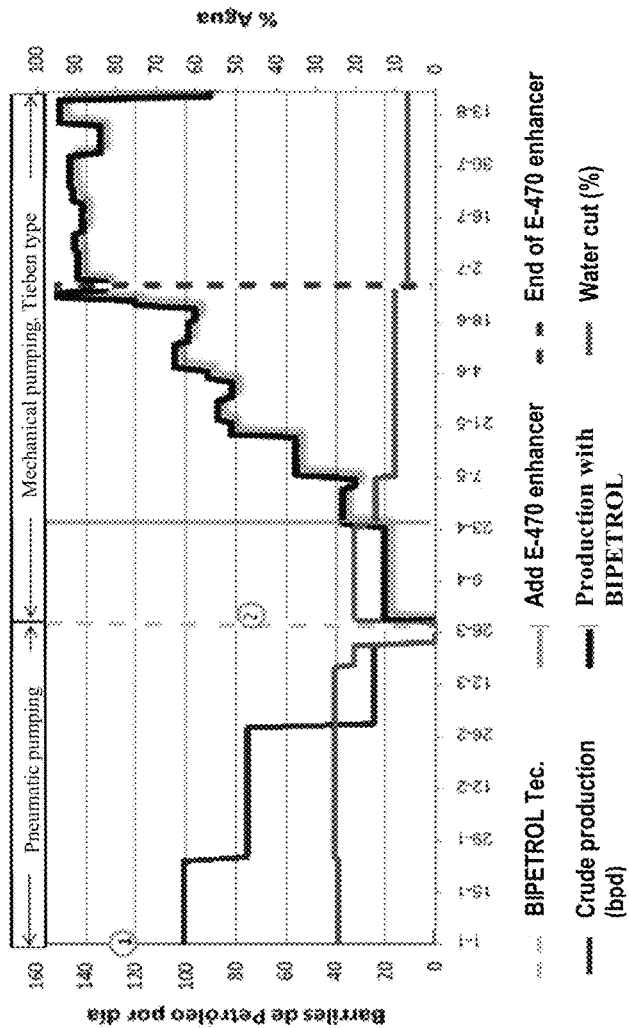

FIG. 5. Effects of the compound of the present invention as an enhancer of oil production.

DETAILED DESCRIPTION OF THE INVENTION

The biodegradable surfactants compound of the present invention is a chemical combination of a non-ionic surfactant and an organic mix in emulsion form. The purpose of this compound is to isolate crude from the tubing, reduce friction to improve crude flow and to enter the oil macromolecule to modify the hydrocarbon chain to reduce its density and thus its viscosity.

The biodegradable surfactants compound reported in the present application has been designed for its application on crude oil so that upon contact with the crude a weak emulsion is formed allowing for a very close interaction between the two; this interaction leads to the extraction of undesired contaminants; at the end the emulsion breaks thus improving the physico-chemical properties of the crude.

This action of the product within the production system is known as pseudoemulsion. This pseudoemulsion produces at its aqueous base an encapsulation of contaminants present thus facilitating their isolation from the reservoir and their removal from the system. Furthermore, the product is capable of generating a sliding effect between the rock pores, moisturizing it with the aqueous phase and improving oil relative permeability. Furthermore, the product will work in light and medium oil reservoirs, and achieved great results with heavy and extra-heavy crudes.

A feature of the biodegradable surfactants compound of the present invention is that it comprises sodium hydroxide 1N, potassium chloride, sulphonic acid, dodecanoic acid, nonylphenol, terpene-1 and water, preferably hard water.

The compound comprises 60-80% v/v of a mix that comprises 2.5-5.5% v/v of sodium hydroxide 1N, 2-4% v/v of potassium chloride, 5-15% v/v of sulphonic acid, 3-6% v/v of dodecanoic acid, 3-8% v/v of nonylphenol of 4-10 mols and hard water, and 20-40% v/v terpene.

Specifically, the sodium hydroxide 1N is incorporated into the formula of the invention to dissolve greasy organic compounds with a high molecular weight and to inhibit precipitation of asphaltic components.

Potassium chloride is used in the formula of the invention to prevent clay swelling. This component is added in low concentrations according to the environment in which it will be applied and for its use 7 kilos of potassium chloride are diluted in 150 liters of water.

Sulphonic acid performs as a surfactant in the product, its purpose being to reduce interfacial tension of the water droplets present in the emulsions that contain crude and to facilitate crude transportation, without altering physico-chemical properties. Its concentration in the compound of the invention is very variable. When used in the oil industry it is used at very low concentrations in organic solvents.

Dodecanoic acid is incorporated into the compound of the invention due to its stability and its linear chain which allow it to partially mix with oil and its derivatives, and because of its polar character which warrants that the combination will mix with water. In this formula its function is to stabilize molecular structure.

Another of the components of the formula of the invention is nonylphenol which has a varied function in the formula by allowing for the formation of a soft emulsion to join the organic and inorganic components, it being a good moisturizer and because it is a non-ionic surfactant it can clean surfaces that require the extraction of oil inorganic contaminants and mix them with water. Finally, terpene I is an excellent asphaltene dispersant and reducer of greasy components existing in oil, such as waxes. Its cyclic structure allows it to perfectly dilute in crude and in small water proportions. Preferably, terpene I is limonene terpene.

In one embodiment of the invention the compound optionally comprises one or more components selected from the group consisting of 8-14% urea, 3-8% sodium tripolyphosphate, 2-6% sodium sulphate, 3-6% liquid Genapol, and 1-4% of a quaternary salt.

The procedure for producing the compound of biodegradable surfactants of the present invention is also part of the claimed invention, and it comprises the following steps:

a. In a clean and dry mixer add an amount no less than 50% v/v of hard water measured against the total volume of the compound of the invention, then add 2.5-5.5% v/v of sodium hydroxide 1N and 2-4% v/v of potassium chloride.

b. Then add 5-15% v/v of sulphonic acid, 3-6% v/v of dodecanoic acid, 3-8% v/v of nonylphenol of 4-10 mols and proceed to shake well until the mix is homogeneous.

c. Once the solution is homogeneous complete the total volume to 100% v/v with hard water without stopping the shaking action.

d. Turn the system off and let stand for 24 hours.

e. Once the standstill period is over, take 60-80% v/v of the solution obtained in step d) and mix it with 20-40% v/v of terpene until a white homogeneous solution is obtained. The mixing process should be conducted during 30 minutes for amounts less than 200 liters.

f. Let the product obtained in step e) to stand during at least 6 hours and then apply it following safety procedures suggested for its use.

Among the multiple applications of this compound the following are worth mentioning: formation cleaning for eliminating particles or deposits of precipitates, incrustations and such processes that tend to limit crude flow in the porous layers near the borehole; the extraction of waxes and other precipitates from crude oil; enhancing physico-chemical properties of crude oil, such as viscosity, gravity, water content, etc., and stimulation of oil production. Furthermore, depending on the concentration used, the compound of the invention is applicable to different kinds of crude oil, reservoirs of crude oil with different API gravities, oil production columns, crude oil pipelines, cleaning of flow stations, of bitumen, greases, oily sands and oil spill sites both on land and off-shore, remediation of oily waste pits, treatment of drilling muds, animal and vegetation cleaning.

The amount to be prepared will be estimated according to the projected use of the compound, whether at surface level or within the reservoir. Before preparing the formula an assessment of the types of contaminants and concomitants to be removed should be realized so as to determine the compatibility and concentrations for mixing the components comprised by the present invention. The concentration of each component of the formula is established according to the acid-basic character that is desired for the reaction to obtain the desired effect on the crude oil.

EXAMPLES

Example 1: Biodegradability Test

The compound of biodegradable surfactants of the present invention was subject to different biodegradability tests at the Environmental Engineering Laboratory of the University of Zulia with the purpose of confirming if it could be used safely without causing harm to the environment and furthermore, to see that said compound will be degraded when said compound is used as a degreaser or for stimulation of unreactive wells. Results shown in FIG. 1 show that the compound of the invention is 40.05% biodegradable after 28 days.

Additionally, Table 1 shows the results of analyses conducted following the method described in "Standard Methods for the Examination of Water and Wastewater", 1999, 20th edition", specifically by application of method 5210-B for determining the Biochemical Demand for Oxygen (mg/L) and method 5220-D for establishing the Chemical Demand for Oxygen (mg/L).

TABLE 1

Results of analyses

| | |
|---|---|
| $DBO_5$, mg/L | 30000 |
| $DBO_{10}$, mg/L | 45000 |
| $DBO_{15}$, mg/L | 65000 |
| $DBO_{20}$, mg/L | 85000 |
| $DBO_{28}$, mg/L | 95000 |
| $DBO_{25}$, mg/L | 100000 |
| DQO, mg/L | 249680 |
| Rate $DBO_5$, mg/L | 0.1201 |
| Rate $DBO_{10}$, mg/L | 0.1802 |
| Rate $DBO_{15}$, mg/L | 0.2603 |
| Rate $DBO_{20}$, mg/L | 0.3404 |
| Rate $DBO_{25}$, mg/L | 0.3804 |
| Rate $DBO_{28}$, mg/L | 0.4005 |

Discussion of the results: the information reported in Table 1 clearly indicates that the compound of the present invention is biodegradable since the amount of matter susceptible to oxidation by biological sources is high as evidenced by the fact that after five days of reaction the $DBO_5$ was 30.000 mg/L and after 28 it increased to 100.000 mg/L.

Example 2: Toxicity Testing

A number of tests were conducted to establish the degree of toxicity of the compound of the present invention by determining its effect on fish in the Lake Maracaibo basin.

The method used for the toxicity test is the one described in "Standard Methods for the Examination of Water and Wastewater", 1999, 20th edition. Basically the test consisted in running a toxicity bioassay to determine the lethal concentration of the compound of the present invention on the selected bioindicator. The calculated value is called "Mean Lethal Concentration ($LC_{50}$) and it corresponds to the concentration that causes death of 50% of the experimental sample after a certain time. Tables 2 through 5 showing the results of these tests are hereon included:

TABLE 2

| | Concentration % | | | | | |
|---|---|---|---|---|---|---|
| | Control | 10 | 25 | 50 | 75 | 100 |
| pH | 7.38 | 7.78 | 7.78 | 7.88 | 8.18 | 8.68 |
| Dissolved oxygen ppm | 4.06 | 5.06 | 5.09 | 4.98 | 4.60 | 4.58 |

TABLE 2-continued

| | Concentration % | | | | | |
|---|---|---|---|---|---|---|
| | Control | 10 | 25 | 50 | 75 | 100 |
| Salinity (mg/L Cl*) | 2000 | 2000 | 2000 | 2000 | 2000 | 2000 |
| Observations at the beginning of testing | Fish are restless. They swim normally both horizontally as well as vertically. They permanently reach to the surface. | | | | | |

TABLE 3

| | Number of survivors | | | | | |
|---|---|---|---|---|---|---|
| | 10 | 10 | 10 | 10 | 9 | 9 |
| (%) of Survivors | 100 | 100 | 100 | 100 | 90 | 90 |
| pH | 7.86 | 8.07 | 7.98 | 8.01 | 8.03 | 7.89 |
| Dissolved oxygen ppm | 4.32 | 4.94 | 4.25 | 4.23 | 4.75 | 4.37 |
| Observations during first 24 hours of testing. | Dead fish were found at concentrations 75% & 100%; 1 and 1 respectively. The rest of the fish in all concentrations swim normally. | | | | | |

TABLE 4

| | Number of survivors | | | | | |
|---|---|---|---|---|---|---|
| | 100 | 90 | 90 | 90 | 99 | 99 |
| (%) of Survivors | 100 | 90 | 90 | 90 | 90 | 90 |
| pH | 7.96 | 8.03 | 8.12 | 8.14 | 8.15 | 7.95 |
| Dissolved oxygen ppm | 4.43 | 4.88 | 4.96 | 5.02 | 4.89 | 4.74 |
| Observations after 48 hours of testing. | Again dead fish were found at concentrations 10%, 25% & 50%; 1, 1 and 1 respectively. The rest of the fish in all concentrations swim normally. | | | | | |

TABLE 5

| | Number of survivors | | | | | |
|---|---|---|---|---|---|---|
| | 100 | 90 | 90 | 90 | 99 | 99 |
| (%) of Survivors | 100 | 90 | 90 | 90 | 90 | 90 |
| pH | 7.96 | 8.03 | 8.12 | 8.14 | 8.15 | 7.95 |
| Dissolved oxygen ppm | 4.43 | 4.88 | 4.96 | 5.02 | 4.89 | 4.74 |
| Observations after 96 hours of testing. | Again dead fish were found at concentrations 25%, 50%, 75% & 100%; 1, 1, 1, 1 respectively and 1 in the control group. The rest of the fish in all concentrations swim normally. | | | | | |

Likewise, FIG. 2 compiles the results of the toxicity tests conducted on the compound of the present invention. Conditions for these tests were:

| | Time intervals | | |
|---|---|---|---|
| | 24 h | 48 h | 96 h |
| LC 50% | — | — | — |

Concentrations expressed as: %, mg/L; Others: % v/v
Species used in tests: *Revistes*
Temperature: 23.5±1.4° C.
Dilution water (characteristics): tap water dechlorinated with chloride salts to 2000 mg/L.

The procedure for sample preparation (recommended by the Venezuelan Institute of Crude Oil Technology—INTEVEP, in Spanish) comprises the following steps:
1. Compound added at the highest concentration required by the producer (10% v/v),
2. Mix well in a blender during 5 minutes,
3. Let the solution stand for 14 hours,
4. Once the oily, aqueous and sediment layers were separated the liquid (aqueous) part was taken aside to prepare the bioassay,
5. To conduct the toxicity test the following concentrations were taken from the liquid obtained: 100%, 75%, 50% and 10% of the diluted fluid.

The method used for the toxicity test was the one described in "Standard Methods for the Examination of Water and Wastewater", 20th edition, 1999, identified as Method number 8010.

Discussion of results: it was not possible to determine LC50 in the test because the product did not produce a mortality of 50%.

The results of the toxicity assays show that the product did not produce a toxic lethal effect on the live species used (*Levistes*). It is worth pointing out that during the test a survival level of between 80% and 100% was obtained in all concentrations until the end of testing. This leads to the conclusion that the compound of the present invention is a non-toxic product and represents a low environmental risk when used at the concentration that should be used for application according to the requesting party, i.e. 10%.

Example 3: Reduction of Oils and Greases

The compound of the present invention also has an agglutinant effect. To determine the degree of this effect an assay was run with the purpose of determining the agglutinant properties that allow cleaning and recovery of crude oil spills in Lake Maracaibo caused by leaks in the production systems. This assay also allowed the determination of the amount of crude extracted from the waters when the compounds of the present invention come in contact with water.

For this test oil spills were simulated in four (4) experimental units. For the assays 800 mL of water were used to which 4 mL of the compound of the invention were added at different doses (1, 5 and 10%), and an experimental unit to which no product was added was used as control. Finally, after ten (10) minutes and after two (2) hours the amount of crude in water was measured in each of the experimental units.

Analyses were conducted according to "Standard Methods for the Examination of Water and Wastewater". 20th Edition, 1999. The method specifically followed the parameters for Oils and Greases (mg/L) No. 5520-C. Results of the analyses conducted in the laboratory are shown in Tables 6 and 7.

TABLE 6

RESULTS OF THE ANALYSES

| Samples 10 minutes after applying product | Oils and Greases (mg/L) |
|---|---|
| Unit 1: Water with crude; no product applied | 2.81 |
| Unit 2: Water with crude; product applied at 1.0% | 0.85 |

TABLE 6-continued

RESULTS OF THE ANALYSES

| Samples 10 minutes after applying product | Oils and Greases (mg/L) |
|---|---|
| Unit 3: Water with crude; product applied at 5.0% | 0.72 |
| Unit 4: Water with crude; product applied at 10.0% | 0.58 |

TABLE 7

RESULTS OF THE ANALYSES

| Samples 2 hours after applying product | Oils and Greases (mg/L) |
|---|---|
| Unit 1: Water with crude; no product applied | 8.63 |
| Unit 2: Water with crude; product applied at 1.0% | 0.76 |
| Unit 3: Water with crude; product applied at 5.0% | 0.46 |
| Unit 4: Water with crude; product applied at 10.0% | 0.37 |

Discussion of results: results in Table 6 show that application of the compound of the present invention drastically reduces the concentration of oils and greases a few instants after adding the product at the different concentrations. Table 7 shows that after two hours in the experimental unit in which the product was not applied oils and greases have dissolved in a greater amount of water whereas in the units where the claimed compound was added no dispersion was observed and on the contrary, concentrations were lower than those seen 10 minutes after the addition of the product.

Example 4: Tests Regarding the Enhancement Effect on the Physico-Chemical Properties of the Crude A SARA study (Saturates, Aromatics, Resins and Asphaltenes) was conducted to observe the effect of the claimed compound on a medium type crude from Eastern Zulia state. The study was done at the Institute of Petroleum Research of the University of Zulia (INPELUZ, acronym in Spanish). Table 8 reports water, sediments, and emulsion content of a sample taken from a canal that runs behind the tank station; no non-ionic surfactant was applied. Table 9 summarizes results of the SARA assessment of the original sample to identify its initial chemical properties.

TABLE 8

RESULTS OF ANALYSIS OF THE ORIGINAL SAMPLE

| SAMPLE ID | CONTAINER (GALLON) | SEDIMENTS (% v/v) ASTMD 96 | WATER (% v/v) ASTM D96 | EMULSION (% v/v) |
|---|---|---|---|---|
| PDVSA-Bachaquero Tank station | 1 | 1.00 | 16.00 | 12.00 Strong |

TABLE 9

SARA ANALYSIS OF THE ORIGINAL SAMPLE

| SAMPLE ID | SATURATES (% w/w) | AROMATICS (% w/w) | RESINS (% w/w) | ASPHALTENES (% w/w) |
|---|---|---|---|---|
| PDVSA-Bachaquero Tank station | 40.03 | 24.87 | 28.11 | 6.98 |

Table 10 reports water, sediments, and emulsion content of a sample taken from a canal that runs behind the tank station after applying the compound of non-ionic surfactant of the present invention, and Table 11 summarizes results of the SARA assessment of the crude mix with 5% of the claimed compound added to determine the chemical effects on the crude oil.

TABLE 10

RESULTS OF ANALYSIS OF THE TREATED SAMPLE

| SAMPLE ID | CONTAINER (GALLON) | SEDIMENTS (% v/v) ASTMD 96 | WATER (% v/v) ASTM D96 | EMULSION (% v/v) |
|---|---|---|---|---|
| PDVSA-Bachaquero Tank station | 1 | 3.00 | 16.00 | 0.00 |

TABLE 11

SARA ANALYSIS OF THE TREATED SAMPLE

| SAMPLE ID | SATURATES (% w/w) | AROMATICS (% w/w) | RESINS (% w/w) | ASPHALTENES (% w/w) |
|---|---|---|---|---|
| PDVSA-Bachaquero Tank station | 40.36 | 32.04 | 22.04 | 4.90 |

Discussion of results: data in Tables 8-11 leads to the conclusion that the compound of the present invention completely breaks the emulsion. When the compound of the present invention is added the solids in the emulsion separate, as is clearly shown by the increase in sediment content.

Furthermore, results of the SARA chemical analyses (before and after treatment) show that by adding 5% of the claimed compound physico-chemical properties of the crude are enhanced on account of a substantial increase in aromatics, a fact that prevents precipitation of organic solids. It is evident that the application of this compound can break emulsions and separate organic and inorganic solids from the flow.

Example 5: Testing to Verify Enhancement of Crude Oil Fluidity Inside a Pipeline The multiple tests run with the compound of the present invention evidence the double effect it has on crude, both downhole and at surface level, as said compound performs as a friction reducer by encapsulating crude and thus preventing its direct contact with the production line, and as a viscosity reducer by enhancing the intrinsic properties of crude. Results of said tests are shown below:

TABLE 12

RESULTS OF SAMPLE ANALYSES

UNTREATED SAMPLE

| | |
|---|---|
| Kinematic Viscosity @ 100° F. (CST) | 7997.99 |
| Kinematic Viscosity @ 180° F. (CST) | 517.87 |

TABLE 12-continued

RESULTS OF SAMPLE ANALYSES

| | |
|---|---|
| API gravity | 10.8 |
| Asphaltene content (% w/w) | 10.32 |
| Wax content (% w/w) | 5.61 |

TREATED SAMPLE

| | |
|---|---|
| Kinematic Viscosity @ 100° F. (CST) | 1265.68 |
| Kinematic Viscosity @ 180° F. (CST) | 287.24 |
| API gravity | 12.80 |
| Asphaltene content (% w/w) | 6.32 |
| Wax content (% w/w) | 3.68 |

A similar test was run on a sample taken from a well in the Boscan field in the state of Zulia. The purpose was to observe the effect the biodegradable compound of the present invention had on the crude. Table 13 and FIG. 3 show the decrease in viscosity at different temperatures.

TABLE 13

RESULTS OF SAMPLE ANALYSES

| SAMPLE COMPOSITION | KINEMATIC VISCOSITY (CST) ASTM D-445 | | |
|---|---|---|---|
| | 80° F. | 120° F. | 180° F. |
| Original crude BN-766 | 21720.14 | 3709.81 | 517.87 |
| Crude + 5% of product | 3988.87 | 1361.53 | 287.24 |

Discussion of results: data in the referred table and figure lead to the assertion that the claimed compound increases the value of API gravity as evidenced by the increase from 10.8° to 12.8° API after adding the compound in a concentration of 5% v/v, equivalent to 51571.20 ppm. Furthermore, viscosity was lowered in a high percentage going from 21720.14 cps to 3988.87 cps after adding the compound in a concentration of 5% v/v. The test was conducted at 80° F. Furthermore, the compound mixed very well with the crude.

Example 6: Testing to Verify Reduction and Dispersion of Organic Precipitates Such as Waxes and Asphaltenes For these tests a number of analyses were conducted in wells in the Bachaquero field, Zulia, to determine the effect of the compound on organic precipitates.

TABLE 14

ANALYSES OF UNTREATED SAMPLES

| SAMPLE ID | WAXES (% w/w) | ASPHALTENES (% w/w) |
|---|---|---|
| B-2342 (22-07-03) | 11.45 | 4.32 |
| B-2360 (22-07-03) | 6.57 | 2.94 |
| B-2364 (22-07-03) | 10.36 | 4.65 |
| B-2397 (22-07-03) | 5.31 | 5.23 |
| B-2401 (23-07-03) | 8.59 | 6.32 |

TABLE 15

ANALYSES OF TREATED SAMPLES

| SAMPLE ID | WAXES (% w/w) | ASPHALTENES (% w/w) |
|---|---|---|
| B-2342 (22-07-03) | 6.23 | 3.54 |
| B-2360 (22-07-03) | 3.96 | 2.66 |
| B-2364 (22-07-03) | 5.78 | 2.13 |
| B-2397 (22-07-03) | 3.24 | 3.99 |
| B-2401 (23-07-03) | 5.69 | 3.31 |

The following work was done by the company Biostar de Venezuela to determine the effect of the product on light oil from the center of Lake Maracaibo with the purpose in mind to use the product in the reservoir to stimulate production directly in wells. Results of these tests are shown in the following tables:

TABLE 16

ANALYSIS OF UNTREATED SAMPLE

| WELL | Water (% w/w) ASTM D-4007 | EMULSION STANDARD (% v/v) | ASPHALTENES (% w/w) | WAXES (% w/w) |
|---|---|---|---|---|
| CLA-0013 | 66.00 | 80.00 Strong | 3.47 | 12.56 |

TABLE 17

ANALYSIS OF THE SAMPLE ADDING 20% OF THE COMPOUND OF THE INVENTION

| WELL | Water (% w/w) ASTM D-4007 | EMULSION STANDARD (% v/v) | ASPHALTENES (% w/w) | WAXES (% w/w) |
|---|---|---|---|---|
| CLA-0013 | 66.00 | 0.00 | 3.36 | 4.64 |

Discussion of results: the tested sample contains a high concentration of wax as can be seen in Table 16. The high concentration of wax strengthens the emulsion and reduces the effectiveness of conventional demulsifiers. By adding the compound of the present invention the amount of wax decreased by 37% forcing emulsion break.

Example 7: Testing to Verify the Effect of the Compound of the Present Invention in Breaking of Water-Oil Emulsions Following are the results of treating a crude sample from the Cumarebo field in northwestern Venezuela. The Cu-144 crude sample had an API gravity of 46.0°. The test was run to determine effects in reducing the emulsion present in the sample.

TABLE 18

ANALYSIS OF UNTREATED SAMPLE

| SAMPLE ID | SEDIMENTS (% v/v) ASTM D-96 | WATER (% v/v) ASTM D-96 | EMULSION POR (% v/v) |
|---|---|---|---|
| Cu-144 (12-11-03) | 0.00 | 22.00 | 35.00 Strong |

TABLE 19

ANALYSIS OF TREATED SAMPLE

| SAMPLE ID | SEDIMENTS (% v/v) ASTM D-96 | WATER (% v/v) ASTM D-96 | EMULSION POR (% v/v) |
|---|---|---|---|
| Cu-144 (12-11-03) | 0.00 | 22.00 | 0.00 |

Discussion of results: the sample was subject to an emulsion analysis by centrifugation using 3% of the product. A quick reaction on the crude was observed and after centrifugation 100% of the emulsion had been broken.

A similar result was observed in the crude samples from Bachaquero, eastern Zulia. In that case the tests were run on samples of heavy and extra-heavy crudes. Results were excellent as shown in the following tables:

TABLE 20

ANALYSIS OF UNTREATED SAMPLE

| SAMPLE ID | SEDIMENTS (% v/v) ASTM D-96 | WATER (% v/v) ASTM D-96 | EMULSION POR (% v/v) |
|---|---|---|---|
| B-2342 (22-07-03) | 0.00 | 18.00 | 24.00 Debil |
| B-2360 (22-07-03) | 0.00 | 0.40 | 0.80 Fuerte |

TABLE 20-continued

ANALYSIS OF UNTREATED SAMPLE

| SAMPLE ID | SEDIMENTS (% v/v) ASTM D-96 | WATER (% v/v) ASTM D-96 | EMULSION POR (% v/v) |
|---|---|---|---|
| B-2364 (22-07-03) | 0.00 | 38.00 | 76.00 Fuerte |
| B-2397 (22-07-03) | 0.00 | 48.00 | 50.00 Fuerte |
| B-2401 (23-07-03) | 0.00 | 96.00 | 12.00 Fuerte |

TABLE 21

ANALYSIS OF TREATED SAMPLE

| SAMPLE ID | SEDIMENTS (% v/v) ASTM D-96 | WATER (% v/v) ASTM D-96 | EMULSION POR (% v/v) |
|---|---|---|---|
| B-2342 (22-07-03) | 0.00 | 18.00 | 4.00 Debil |
| B-2360 (22-07-03) | 0.00 | 0.40 | 2.80 Fuerte |
| B-2364 (22-07-03) | 0.00 | 38.00 | 6.00 Debil |
| B-2397 (22-07-03) | 0.00 | 48.00 | 0.00 Fuerte |
| B-2401 (23-07-03) | 0.00 | 96.00 | 2.00 Fuerte |

Example 8: Tests for Assessing the Effects of the Compound of the Present Invention in Reducing Organic Pollution Such as in Hydrocarbon Waste Pits For this test, the physico-chemical characteristics of the samples were analyzed first and then it was decided to mix together samples from 8 different pits. The mix was divided into 5 parts and the product was applied at five different concentrations (3, 5, 10, 15 and 20%) to determine the effect on the pit sample and establish the possibility of using only one specific concentration. Results were that 3 of the 5 samples showed an effectiveness of 90-100% and the other 2 of 40%. Of the 3 samples with a 90-100% effectiveness only one was taken as a reference.

Next, pursuing the objectives set, it was decided to run complete analyses at the INPELUZ Maracaibo laboratories to establish the purity degree of the recoverable oil and thus discard any doubt on the possible consequences of incorporating the product to the pipeline carrying clean oil. The procedure developed by the INPELUZ Maracaibo laboratories follows bellow:

Take a two-liter sample from each pit (8 pits)
Manually shake the samples to form a "compound sample".
In a 120 mL bottle add 90 mL of the mix+10 mL of the compound of biodegradable surfactants of the present invention.
Shake during 10 minutes and let stand for 3 hours.
Measure the water and sediment content and the interphase, and record the contents of the different phases.
Add 5 drops of a universal emulsion breaker and record the data corresponding to the different phases.

Following are the results obtained in the test:
Results:
A). With the composition reported in this application:
  Water content: 15.30%
  Solids: 0.70%
  Oxidized organic precipitates: 10.0%
  Crude content: 74%

B). With the Universal breaker:
  Water content: 25.30%
  Solids: 0.70%
  Oxidized organic precipitates: 10.0%
  Crude content: 64%

A shown by the above results the difference is that water content is 10% greater with the Universal breaker and the crude content is 10% greater without the Universal breaker. FIG. 4 shows pipettes after having added the compound of the present invention and its contents shaken. The breaking of the emulsion and the oxidized organic precipitates are clearly observed as well as the sediments in the bottom of the pipette.

To conclude, the recommendation is that in view of the results obtained and its compatibility with the chemical demulsifiers this crude can be injected in a pipeline leading to a point where it will be mixed with another crude.

Another case to highlight is the testing conducted on samples from crude oil pits in Maturin, Eastern Venezuela, by the company Biostar, where the compound of the present invention recovered organic as well as inorganic sediments. Recovered organic sediments are reinjected into the crude production line whereas the inorganic sediments and sand may be returned to the environment with no harm of any kind to Nature or man.

TABLE 22

ANALYSIS OF UNTREATED SAMPLE

| Well | Inorganic sediments (% v/v) | Organic Sediments (% v/v) | Water (% w/w) ASTM D-4007 | Emulsion Standard (% v/v) |
|---|---|---|---|---|
| OREO-5 pit, MATURIN | 0.40 | 0.45 | 13.00 | 10.00 Strong |

TABLE 23

ANALYSIS OF THE SAMPLE WITH 2.5% OF THE COMPOUND OF THE PRESENT INVENTION

| Well | Inorganic sediments (% v/v) | Organic Sediments (% v/v) | Water (% w/w) ASTM D-4007 | Emulsion Standard (% v/v) |
|---|---|---|---|---|
| OREO-5 pit, MATURIN | 0.00 | 0.25 | 13.50 | 5.00 Weak |

It is important to mention the use of the compound of the present invention by the company BiPetrol as a matrix non-reactive stimulator in well Samaria-824 in Villahermosa, Mexico. Before injecting the claimed compound the well produced 27 barrels of crude oil per day with a water cut of 24.00% v/v. The injection aimed at undoing the harm present and promote the necessary conditions to increase production.

FIG. 5 shows that after treating the well, production increased to more than 140 barrels per day with a water cut of 7.00% v/v, evidencing the effects of the compound when used within the reservoir.

The invention claimed is:

1. A process for producing a composition of biodegradable surfactants comprising sodium hydroxide 1N, potassium chloride, sulphonic acid, dodecanoic acid, nonylphenol, terpene-1 and water, comprising the following steps:
  combine an amount of hard water less than 50% v/v in respect of the total volume of the composition, 2.5-5.5% v/v of sodium hydroxide 1N, and 2-4% v/v of potassium chloride;

add 5-15% v/v of sulphonic acid, 3-6% v/v of dodecanoic acid, and 3-8% v/v of nonylphenol of 4-10 mols, and shake the mix until it is homogeneous;
once homogeneity is achieved, complete the total volume to 100% v/v with hard water, mixing continuously;
let stand for 24 hours;
after the 24-hour standing period, extract 60-80% v/v of the mixture and mix it with 20-40% v/v of terpene until a white homogeneous mixture is formed; and
let stand for at least 6 hours.

* * * * *